United States Patent
Tohyama (10) Patent No.: US 8,264,597 B2
(45) Date of Patent: Sep. 11, 2012

(54) IMAGE PICKUP APPARATUS THAT ENABLES SHOOTING WITH LIGHT EMISSION DEVICE, AND CONTROL METHOD THEREFOR

(75) Inventor: Kei Tohyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 12/879,736

(22) Filed: Sep. 10, 2010

(65) Prior Publication Data

US 2011/0069219 A1    Mar. 24, 2011

(30) Foreign Application Priority Data

Sep. 18, 2009   (JP) ................................. 2009-217429

(51) Int. Cl.
*H04N 5/222* (2006.01)
(52) U.S. Cl. ...................................... 348/371; 396/180
(58) Field of Classification Search ........... 348/207.99, 348/211.1, 211.2, 211.4, 370, 371; 396/56–59, 396/61, 62, 106–110, 155–206; 365/200; 352/49, 198–203; 250/214 SF
See application file for complete search history.

(56) References Cited

U.S. PATENT DOCUMENTS

| | | | | |
|---|---|---|---|---|
| 6,047,137 | A * | 4/2000 | Yamamoto | 396/157 |
| 6,404,987 | B1 * | 6/2002 | Fukui | 396/56 |
| 2002/0009296 | A1 * | 1/2002 | Shaper et al. | 396/56 |
| 2002/0064383 | A1 * | 5/2002 | Kawasaki et al. | 396/157 |
| 2002/0064384 | A1 * | 5/2002 | Kawasaki et al. | 396/157 |
| 2002/0127019 | A1 * | 9/2002 | Ogasawara | 396/661 |
| 2005/0031333 | A1 * | 2/2005 | Yamazaki et al. | 396/157 |
| 2005/0128829 | A1 * | 6/2005 | Tohyama | 365/200 |
| 2008/0298793 | A1 * | 12/2008 | Clark | 396/57 |
| 2009/0135262 | A1 * | 5/2009 | Ogasawara | 348/211.4 |
| 2010/0008658 | A1 * | 1/2010 | King | 396/56 |
| 2010/0202767 | A1 * | 8/2010 | Shirakawa | 396/56 |
| 2010/0209089 | A1 * | 8/2010 | King | 396/56 |
| 2010/0254693 | A1 * | 10/2010 | Yamashita | 396/161 |
| 2012/0045193 | A1 * | 2/2012 | King | 396/56 |

FOREIGN PATENT DOCUMENTS

JP    2006-084608    3/2006

* cited by examiner

*Primary Examiner* — Nelson D. Hernández Hernández
*Assistant Examiner* — Dennis Hogue
(74) *Attorney, Agent, or Firm* — Cowan, Liebowitz & Latman, P.C.

(57) ABSTRACT

An image pickup apparatus that enables shooting with a light emission device. An image pickup unit accumulates electric charge corresponding to an incident light. A mechanical shutter runs from an impervious position that blocks the incident light to the image pickup unit to a pervious position. An accumulation control unit controls a start timing of the accumulation of electric charge by the image pickup unit. A determination unit determines whether a communication with the light emission device is possible. A control unit controls the mechanical shutter to start running from the impervious position to the pervious position before the determination unit determines that the communication with the light emission device is possible, and controls the accumulation control unit to start accumulation of electric charge after the determination unit determines that the communication with the light emission device is possible, when shooting with the light emission device.

6 Claims, 6 Drawing Sheets

IMAGE PICKUP APPARATUS THAT ENABLES SHOOTING WITH LIGHT EMISSION DEVICE, AND CONTROL METHOD THEREFOR

BACKGROUND OF THE INVENTION

1. Field of the Invention

The present invention relates to an image pickup apparatus that enables shooting with a light emission device (a flash device), and a control method therefor.

2. Description of the Related Art

A wireless stroboscope system that establishes a wireless connection between a master flash device connected to the camera and a slave flash device using optical communications by lights from discharge tubes to emit lights synchronously is known conventionally. For example, Japanese Laid-Open Patent Publication (Kokai) No. 2006-84608 (JP 2006-84608A) discloses a flash device that is mounted on a camera providing a focal plane shutter to construct a wireless stroboscope system.

Since the optical communications of the conventional wireless stroboscope system are one-way communications from the master flash device to the slave flash device, the master flash device is not able to receive a reception confirmation signal from the slave flash device. Therefore, the following methods are adopted to check whether communication between the master flash device and the slave flash device is established. In one method, a test emission signal is transmitted from the master flash device, and when receiving the signal, the slave flash device performs test emission to inform that the communication is established. In another method, a user checks whether the slave flash device emits a light at the time of shooting. In such a checking method, since the master flash device and the slave flash device have to emit light once, there are problems of wasting energy and of requiring a time for re-charging.

In order to solve the problems, a wireless stroboscope system that enables two-way communications between the master flash device and the slave flash device using radio waves can be designed. However, when the wireless stroboscope system using radio waves is used in combination with a camera having a mechanical shutter such as a focal plane shutter, an operation of the mechanical shutter needs to start after the establishment of communication is confirmed at the time of a light emission start. Therefore, the following problem of time lag occurs.

That is, when a release switch is pushed and a control unit of the camera starts a process of a shooting operation, the control unit of the camera controls the master flash device to transmit a transmission checking signal to the slave flash device. When receiving this signal, the slave flash device replies a communication confirmation OK signal to the master flash device. When the master flash device receives the communication confirmation OK signal, the control unit of the camera starts to run a first curtain of a mechanical focal plane shutter. However, in this case, the first curtain of the mechanical focal plane shutter is driven after the control unit of the camera receives the communication confirmation OK signal via the master flash device. Therefore, there is a remarkable time lag between the timing at which the release switch is pushed and the timing at which the first curtain of the focal plane shutter starts to run.

SUMMARY OF THE INVENTION

Accordingly, a first aspect of the present invention provides an image pickup apparatus that enables shooting with a light emission device comprising an image pickup unit configured to accumulate electric charge corresponding to an incident light, a mechanical shutter configured to run from an impervious position that blocks the incident light to the image pickup unit to a pervious position, an accumulation control unit configured to control a start timing of the accumulation of electric charge by the image pickup unit, a determination unit configured to determine whether a communication with the light emission device is possible, and a control unit configured to control the mechanical shutter to start running from the impervious position to the pervious position before the determination unit determines that the communication with the light emission device is possible, and to control the accumulation control unit to start accumulation of electric charge after the determination unit determines that the communication with the light emission device is possible, when shooting with the light emission device.

Accordingly, a second aspect of the present invention provides a control method for an image pickup apparatus that enables shooting with a light emission device and that includes an image pickup unit configured to accumulate electric charge corresponding to an incident light, a mechanical shutter configured to run from an impervious position that blocks the incident light to the image pickup unit to a pervious position, and an accumulation control unit configured to control a start timing of the accumulation of electric charge by the image pickup unit, the control method comprising a determination step of determining whether a communication with the light emission device is possible, an instruction step of instructing the mechanical shutter to start running from the impervious position to the pervious position before it is determined that the communication with the light emission device is possible in the determination step; and a starting step of starting the accumulation of electric charge after it is determined that the communication with the light emission device is possible in the determination step when shooting with the light emission device.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
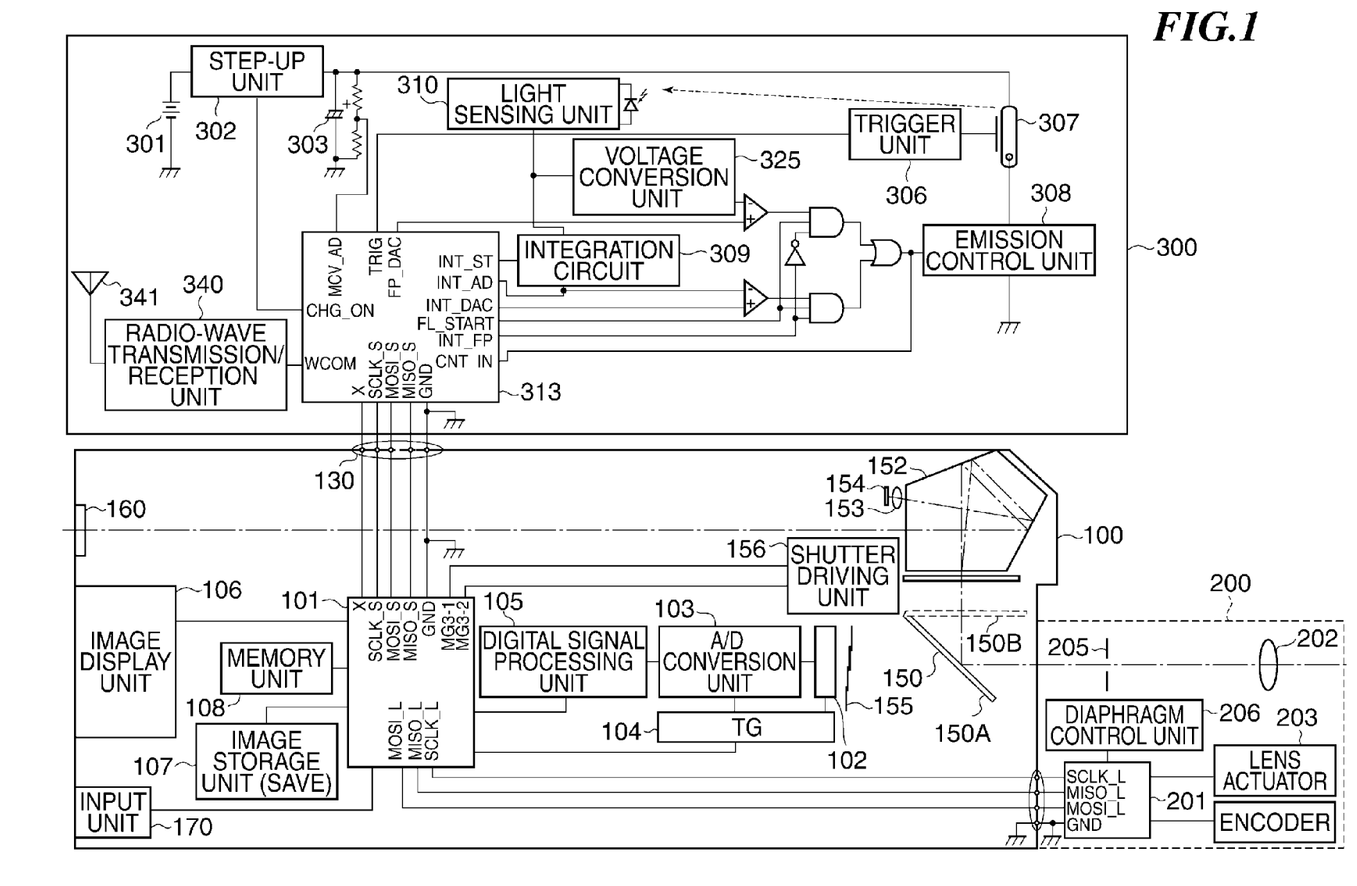
FIG. 1 is a block diagram schematically showing configurations of a camera and a master flash device according to an embodiment of the present invention.
Figure 2:
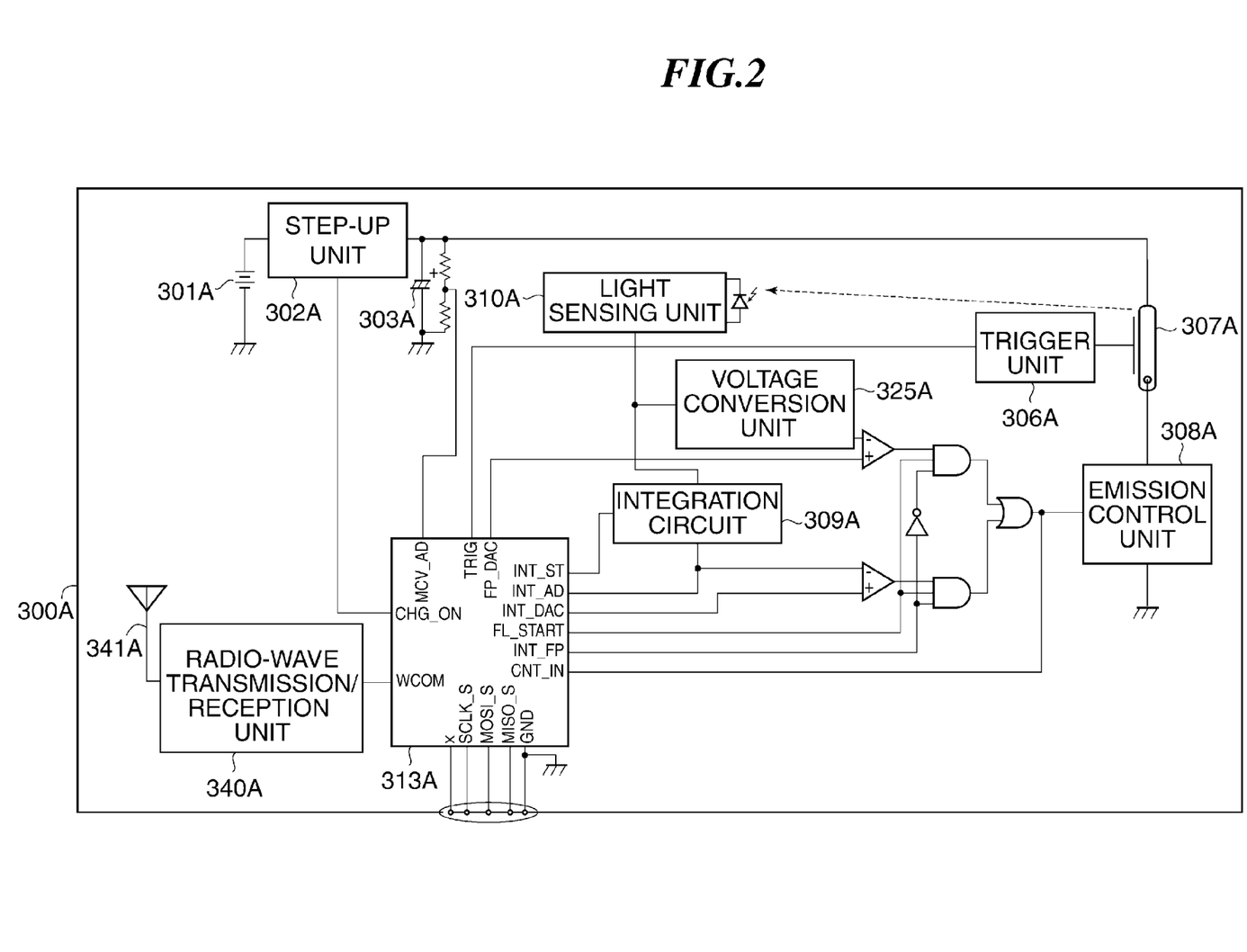
FIG. 2 is a block diagram schematically showing a configuration of a slave flash device.

FIG. 1 is a block diagram schematically showing configurations of a camera and a master flash device according to an embodiment of the present invention. FIG. 2 is a block diagram schematically showing a configuration of a slave flash device.

A lens unit 200 and the master flash device 300 are connected to a camera 100, and they constitute an image pickup apparatus. A wireless stroboscope system comprises the image pickup apparatus and a slave flash device 300A.

The camera 100 is provided with a camera microcomputer 101, an image pickup device 102, an A/D conversion unit 103, a timing generator (TG) 104, a digital signal processing unit 105, an image display unit 106, an image storage unit 107, a memory unit 108, etc.

The camera microcomputer 101 performs a calculation and controls respective units of the camera 100. The image pickup device 102 comprises a CCD, a CMOS, etc. including an infrared cut filter, a low pass filter, etc. and performs a photoelectric conversion of a picked-up object image. The A/D conversion unit 103 applies an analog-to-digital conversion to a signal from the image pickup device 102. The timing generator (TG) 104 generates a driving timing for the image pickup device 102 and the A/D conversion unit 103, and performs an accumulation control of the image pickup device 102.

The digital signal processing unit 105 applies an image process to the image data that is converted into a digital format by the A/D conversion unit 103 according to image processing parameters. The image display unit 106 displays the image picked-up by the image pickup device 102, settings, etc. The image storage unit 107 stores the picked-up image. The memory unit 108 stores information about the image etc.

The camera 100 is provided with a main mirror 150, a pentaprism 152, a finder 160, an image formation lens 153 that is a taking optical system, a photometry unit 154, a focal plane shutter 155 that is a mechanical shutter, and a shutter driving unit 156, as optical components.

The mechanical focal plane shutter 155 blocks the incident light to a light receiving surface of the image pickup device 102 by a first curtain or a second curtain. In the case of exposure, the first curtain runs from an impervious position to a pervious position, and a second curtain runs from a pervious position to an impervious position after a predetermined exposure time elapses. The shutter driving unit 156 controls the first curtain of the focal plane shutter 155 according to a signal from an MG3-1 terminal of the camera microcomputer 101, and controls the second curtain according to a signal from an MG3-2 terminal. The image pickup device 102 is provided with an electronic shutter mode that starts and stops an accumulation operation of an electric charge (image data) according to a driving signal from the TG 104 after the first curtain of the focal plane shutter 155 starts to run.

The camera 100 is provided with an interface 130 with the master flash device 300 in order to enable communications between the camera microcomputer 101 and a flash device microcomputer 313 of the master flash device 300.

A lens microcomputer 201, a lens 202, a lens actuator 203, a diaphragm 205, a diaphragm control unit 206, etc. are arranged in the lens unit 200 connected to a body of the camera 100.

The camera 100 is provided with an input unit 170, and is able to set an exposure time at the time of shooting, an aperture value, a photographic sensitivity, etc. according to a user's input through the input unit 170. In addition, a release switch, which is an operation switch to receive a shooting start instruction from a user, is also arranged on the input unit 170.

Next, a configuration of the master flash device 300 will be described. The master flash device 300 is connected to the camera 100 with a cable, and performs two-way wireless communications (wireless communications) with the slave flash device 300A to control a light emission of the slave flash device 300A. It should be noted that the master flash device 300 may be built in the camera 100.

The master flash device 300 is provided with a battery 301, a step-up unit 302, the flash device microcomputer 313, a discharge tube 307, a trigger unit 306, an emission control unit 308, a light sensing unit 310, an integration circuit 309, a voltage conversion unit 325, a radio-wave transmission/reception unit 340, etc.

The flash device microcomputer 313 controls operations of the respective units of the master flash device that functions as a master communication apparatus. The discharge tube 307 converts the energy, which is supplied from the battery 301 and is stepped up by the step-up unit 302 and is charged into the capacitor 303, into a light to irradiate an object. The trigger unit 306 makes the voltage of several kilovolts be applied to the discharge tube 307 at the time of the light emission starts. The emission control unit 308 controls to start and stop the emission of the discharge tube 307, and forms an electric discharge loop connecting a high-voltage side of the capacitor 303, the discharge tube 307, the emission control unit 308, and the low-voltage side of the capacitor 303 at the time of emission. The light sensing unit 310 comprises a sensor such as a photo-diode that detects the light quantity of the discharge tube 307.

The integration circuit 309 integrates the light quantity received by the light sensing unit 310. An output of the integration circuit 309 is applied to an A/D converter terminal INT_AD of the flash device microcomputer 313, and is supplied to the emission control unit 308 via a logic circuit section that comprises a comparator and logic gates.

The voltage conversion unit 325 converts a photoelectric current that is received by the light sensing unit 310 into voltage. The radio wave transmission/reception unit 340 is connected to an antenna 341 to perform wireless transmission and reception, and communicates with the flash device microcomputer 313 via a WCOM terminal.

It should be noted that a master communication apparatus that is not provided with the flash device section including the capacitor 303, the discharge tube 307, etc. may be used instead of the master flash device 300. The radio wave transmission/reception unit 340 and the antenna 341 may be contained in the camera 100.

Next, a configuration of the slave flash device shown in FIG. 2 will be described. The slave flash device 300A can perform the two-way wireless communication with the master flash device 300, and enables a wireless shooting by performing a light emission etc. according to the communication from the master flash device 300.

In FIG. 2, the slave flash device 300A has the same configuration as the master flash device 300. Namely, a battery 301A, a step-up unit 302A, a flash device microcomputer 313A, a discharge tube 307A, a trigger unit 306A, an emission control unit 308A, a light sensing unit 310A, an integration circuit 309A, a voltage conversion unit 325A, and a radio-wave transmission/reception unit 340A shown in FIG. 2 are corresponding to the same components shown in FIG. 1, respectively.

Hereafter, operations of the master flash device 300 connected to the camera 100 and the slave flash device 300A will be described.

In the master flash device 300, the flash device microcomputer 313 keeps a CHG_ON terminal at an H (High) level to operate the step-up unit 302 so as to charge the capacitor 303. The charge voltage is inputted into the flash device microcomputer 313 from a MCV_AD terminal, and is detected as a voltage signal MCV that has been digitized by the A/D conversion process within the flash device microcomputer 313. The charge continues until the voltage signal MCV becomes equal to or larger than a predetermined voltage.

In response to the communication from the camera microcomputer 101, the flash device microcomputer 313 sends signals for the wireless communication to the slave flash devices 300A such as a communication confirmation signal and a light emission start signal to the radio-wave transmission/reception unit 340 via the WCOM terminal. The radio-wave transmission/reception unit 340 transmits the signals to the slave flash device 300A by a radio wave through the antenna 341.

A communication reception signal by the radio wave from the slave flash device 300A is inputted into the WCOM terminal of the flash device microcomputer 313 via the antenna 341 and the radio-wave transmission/reception unit 340. The flash device microcomputer 313 transmits contents of the received signal to the camera microcomputer 101.

It should be noted that the existing wireless LAN, Bluetooth, ZigBee, etc. can be used as a protocol of the radio-wave transmission and reception.

Next, operations of the slave flash device 300A will be described. In the slave flash device 300A, the flash device microcomputer 313A keeps a CHG_ON terminal at the H level to operate the step-up unit 302A so as to charge the capacitor 303A. A charging process is the same as that of the master flash device 300.

The slave flash device 300A receives the signal by the radio wave transmitted from the master flash device 300 via the antenna 341A and the radio wave transmission/reception unit 340A, and inputs the signal into the WCON terminal of the flash device microcomputer 313A. According to a communication content, the flash device microcomputer 313A replies the communication reception signal to the master flash device 300 through the radio-wave transmission/reception unit 340A and the antenna 341A, and controls an emission of the slave flash device 300A.

Next, operations of the slave flash device 300A during the wireless communication will be described in detail.

When the radio-wave transmission/reception unit 340A receives a predetermined communication format such as a predetermined communication packet etc. via the antenna 341A, the radio-wave transmission/reception unit 340A inputs the received signal to the WCOM terminal of the flash device microcomputer 313A. When receiving this signal, the flash device microcomputer 313A executes a communication interruption process.

In this communication interruption process, when the received communication content is the communication confirmation signal from the master flash device 300, the flash device microcomputer 313A replies the communication reception signal to the master flash device 300 via the radio-wave transmission/reception unit 340A and the antenna 341A. And the interruption process is finished after the reply.

On the other hand, when the received communication content is the light emission start signal from the master flash device 300, the flash device microcomputer 313A performs a light emission start process (described below), and finishes the interruption process after the emission is completed.

Moreover, when the received communication content is an emission quantity setting signal from the master flash device 300, the flash device microcomputer 313A sets a voltage value corresponding to the emission quantity to an INT_DAC terminal, and finishes the interruption process after the setting is completed.

Next, the light emission start process executed by the flash device microcomputer 313A of the slave flash device 300A will be described in detail.

The flash device microcomputer 313A outputs the voltage corresponding to the emission quantity from the INT_DAC terminal, holds an INT_FP terminal and a FL_START terminal as the H level, and holds a TRIG terminal as the H level for a predetermined time interval. As a result, the discharge tube 307 starts to emit a light. At the same time, the flash device microcomputer 313A holds an INT_ST terminal at the H level to start an operation of the integration circuit 309A.

The integration circuit 309A integrates the light received by the light sensing unit 310A. When an integrated output becomes higher than the value set at the INT_DAC terminal, the emission control unit 308A intercepts the electric discharge loop to stop the electric discharge.

The flash device microcomputer 313A detects the emission quantity (INT) of the discharge tube 307 by applying an A/D conversion to the output of the integration circuit 309A inputted to the INT_AD terminal.

Next, operations of the camera microcomputer 101 at the time of shooting will be described with reference to FIG. 3, FIG. 4A, and FIG. 4B.

Figure 3:
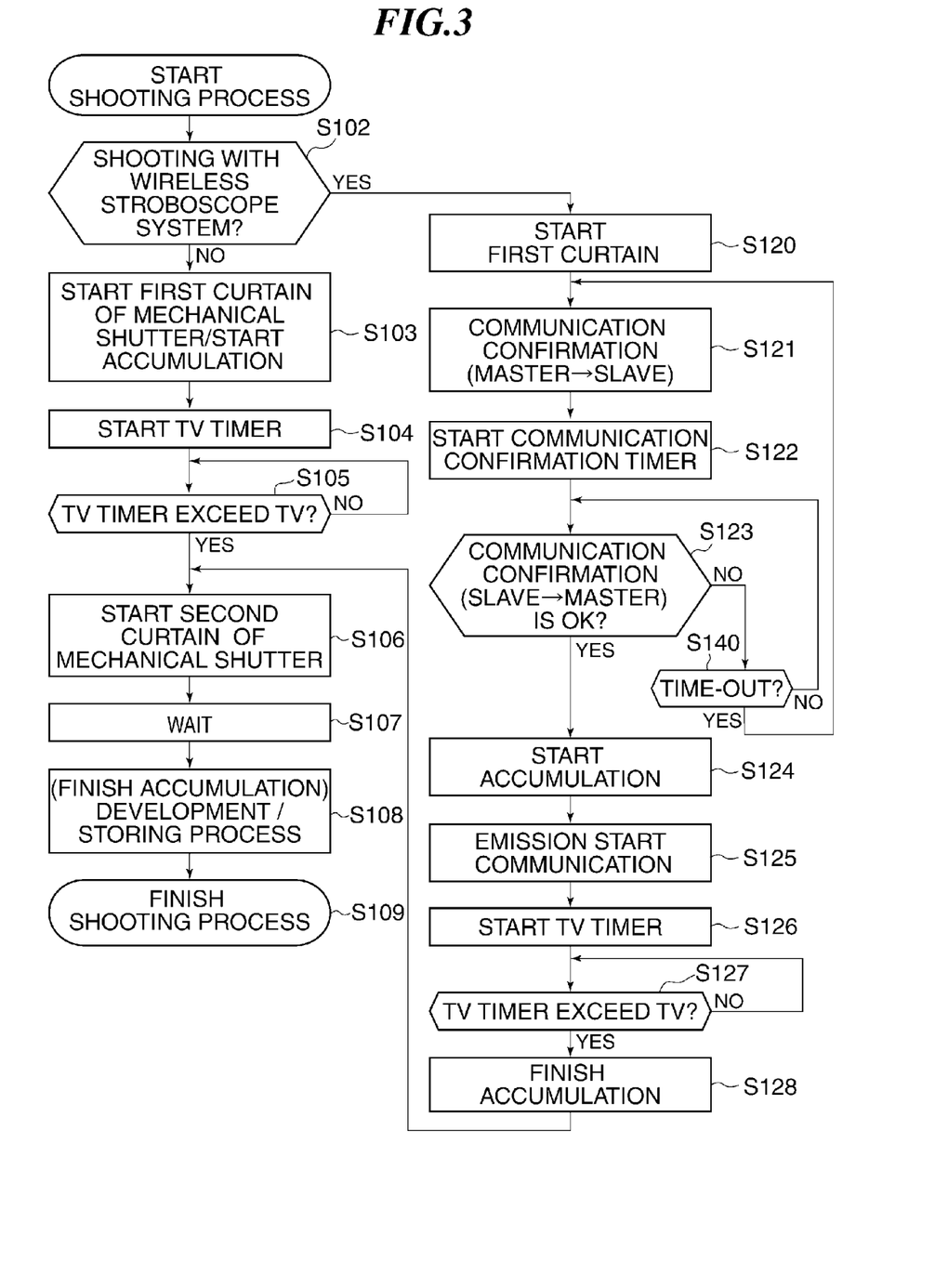
FIG. 3 is a flowchart showing operations at the time of shooting according to a first embodiment.

FIG. 3 is a flowchart showing operations at the time of shooting according to a first embodiment. FIG. 4A is a timing waveform chart showing operations at the time of normal shooting according to the first embodiment. FIG. 4B is a timing waveform chart showing operations at the time of shooting with the wireless stroboscope system according to the first embodiment.

Figure 4A:
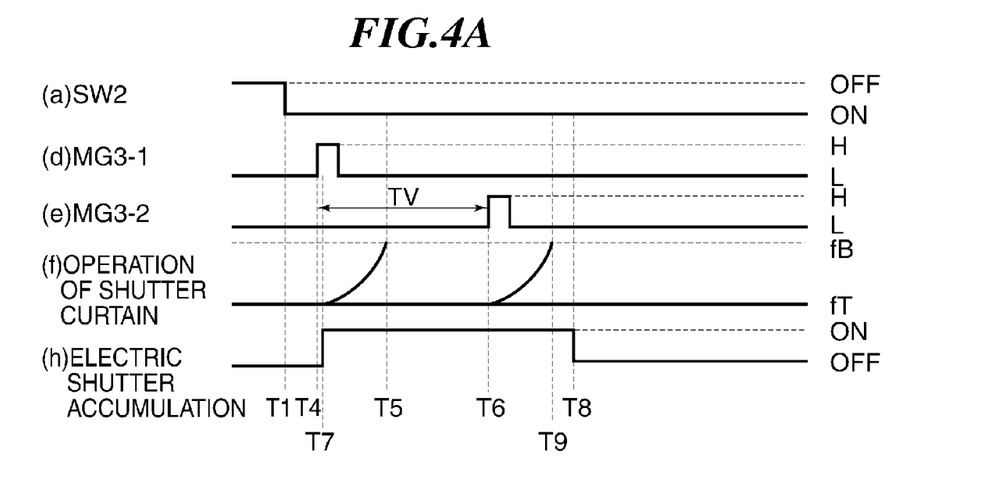
FIG. 4A is a timing waveform chart showing operations at the time of normal shooting according to the first embodiment.
Figure 4B:
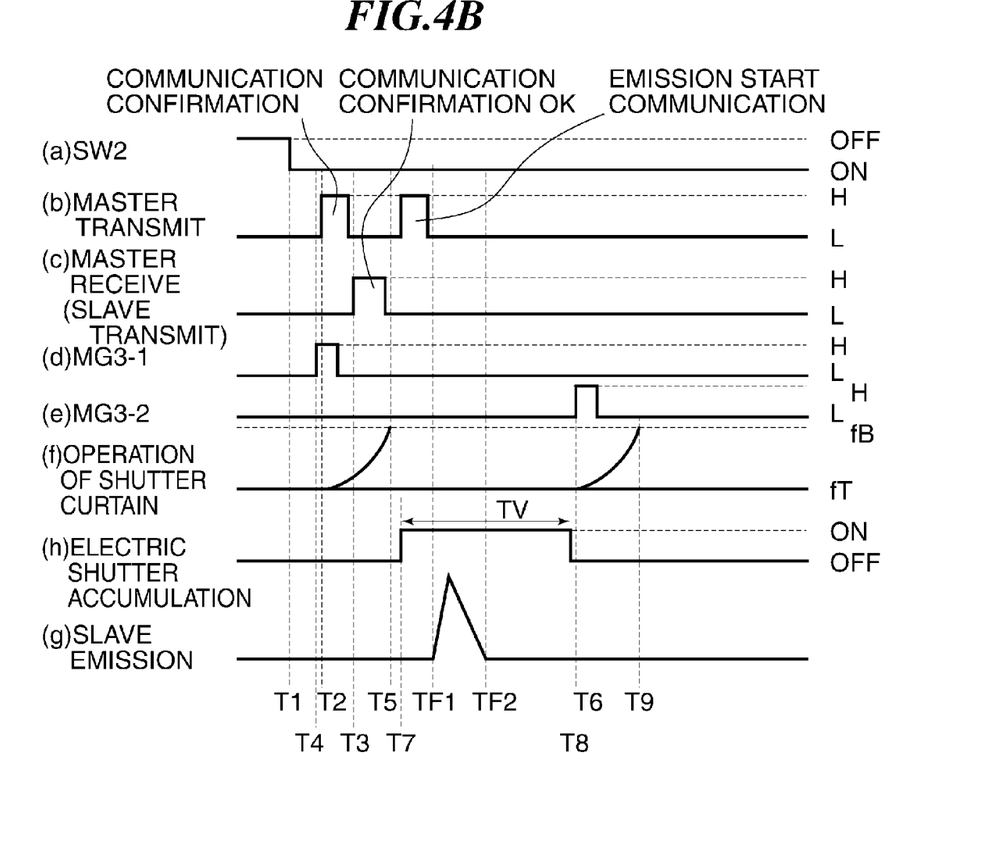
FIG. 4B is a timing waveform chart showing operations at the time of shooting with a wireless stroboscope system according to the first embodiment.

When the release switch SW2 is pushed and is turned ON from OFF (T1 of (a) in FIG. 4A and FIG. 4B), the camera microcomputer 101 starts a shooting operation process shown in FIG. 3. In step S102, the camera microcomputer 101 determines whether the shooting is the normal shooting or the shooting with the wireless stroboscope system, based on the setting of the camera 100 or the communication with the flash device microcomputer (at the master side) 313. When it is the normal shooting, the process is proceeded to step S103. When it is the shooting with the wireless stroboscope system, the process is proceeded to step S120.

First, the operations in the normal shooting will be described. In the step S103, the camera microcomputer 101 instructs the shutter driving unit 156 to start running the first curtain of the focal plane shutter 155 by holding the MG3-1 terminal at the H level for a predetermined time interval (T4 of (d) in FIG. 4A). The camera microcomputer 101 starts accumulation of the image data from the image pickup device 102 via the TG 104 (T7 of (h) in FIG. 4A). It should be noted that the first curtain of the focal plane shutter 155 runs from a screen top fT to a screen bottom fB after a predetermined time elapses from the instruction for starting to run as shown by (f) in FIG. 4A. Accordingly, the timing to start accumulation by the image pickup device 102 is immediately after the first curtain of the focal plane shutter 155 starts to run, and is before a light begins to irradiate the image pickup device 102.

In next step S104, the camera microcomputer 101 starts a TV timer. This TV timer measures progress of exposure time TV that is set up by the input unit 170 or exposure time TV that is calculated by the camera microcomputer 101 based on measured by the photometry unit 154. In the normal shooting, the exposure time TV is defined by time interval between the running start timing of the first curtain of the focal plane shutter 155 and the running start timing of the second curtain.

In the following step S105, the camera microcomputer 101 determines whether the measuring time by the above-mentioned TV timer exceeds the exposure time TV. When the exposure time TV elapses, the process proceeds to step S106. In the step S106, the camera microcomputer 101 instructs the shutter driving unit 156 to start running the second curtain of the focal plane shutter 155 by holding the MG3-2 terminals at the H level for a predetermined time interval (T6 of (e) in FIG. 4A).

In next step S107, the camera microcomputer 101 waits until the second curtain of the focal plane shutter 155 finishes running to the impervious position to shade the image pickup device 102. The second curtain of the focal plane shutter 155 finishes running in the timing T9 of (f) in FIG. 4A, and shades the image pickup device 102.

In next step S108, the camera microcomputer 101 finishes the accumulation of the image data by the image pickup device 102 via the TG 104 (T8 of (h) in FIG. 4A). The camera microcomputer 101 performs a development process of the image data accumulated in the image pickup device 102 via the A/D conversion unit 103, the TG 104, and the digital signal processing unit 105. The camera microcomputer 101 finishes the shooting process in step S109 after storing the developed image data into the image storage unit 107.

Next, the shooting operation when shooting with the wireless stroboscope system will be described.

In the step S120, the camera microcomputer 101 instructs the shutter driving unit 156 to start running the first curtain of the focal plane shutter 155 by holding the MG3-1 terminal at the H level for a predetermined time interval (T4 of (d) in FIG. 4B), and then, proceeds with the process to step S121. In the step S121, the camera microcomputer 101 instructs the flash device microcomputer 313 to transmit a wireless signal for confirming communication (a communication confirmation signal) to the slave flash device 300A via the radio-wave transmission/reception unit 340 and the antenna 341 (T2 of (b) in FIG. 4B).

In the following step S122, the camera microcomputer 101 starts a communication confirmation timer that measures a time progress for waiting a reply of communication confirmation OK that shows the communication is executed normally from the slave flash device 300A, and proceeds with the process to step S123. In the step S123, the camera microcomputer 101 determines whether the reply of the communication confirmation OK from the slave flash device 300A is received via the antenna 341, the radio-wave transmission/reception unit 340, and the flash device microcomputer 313 of the master flash device 300. When the reply of the communication confirmation OK is received, the camera microcomputer 101 determines that the communication with the flash device 300A is possible. When the reply of the communication confirmation OK is received, the process proceeds to step S124 (T2 of (c) in FIG. 4B). When the reply is not received, the process proceeds to step S140.

In the step S140, the camera microcomputer 101 determines whether the predetermined time that is waiting time for the reply of the communication confirmation OK from the slave flash device 300A has elapsed. When the predetermined time has not elapsed, the process is returned to the step S123. When the predetermined time has elapsed, the process is returned to the step S121 in order to transmit the wireless signal for confirming communication to the slave flash device 300A again.

Thus, when performing the shooting with the wireless stroboscope system, the camera microcomputer 101 transmits the wireless signal for confirming the communication to the slave flash device 300A using the master flash device 300. And when the signal of the communication confirmation OK from the slave flash device 300A is not able to be received within the predetermined time after the transmission, the wireless signal for confirming communication is again transmitted using the master flash device 300 (a communication retry process).

It should be noted that the number of timeouts may be counted in the step S140 in order to stop the shooting process and to display warning when the number of timeouts reaches a predetermined number.

When the camera microcomputer 101 receives the reply of the communication confirmation OK from the slave flash device 300A, the camera microcomputer 101 starts accumulation of the image data in the image pickup device 102 via the TG 104 in step S124 (T7 of (h) in FIG. 4B).

In next step S125, the camera microcomputer 101 performs light emission start communication with the slave flash device 300A via the flash device microcomputer 313, the radio-wave transmission/reception unit 340, and the antenna 341 (T7 of (b) in FIG. 4B). That is, the camera microcomputer 101 transmits the instruction signal for making the slave flash device 300A emit light after receiving the reply of the communication confirmation OK to the master flash device 300. And then, the master flash device 300 transmits the light emission start signal to the slave flash device 300A. At this time, the first curtain of the focal plane shutter 155 has run to the pervious position (the position fB) that does not shade the image pickup device 102, as shown by the timing T5 of (f) in FIG. 4B.

When receiving the light emission start signal (TF1 of (g) in FIG. 4B), the slave flash device 300A starts to emit a light.

In step S126, the camera microcomputer 101 starts a TV timer. Exposure time TV is defined by accumulation time of the image data by the image pickup device 102 at the time of the shooting with the wireless stroboscope system. In step S127, the camera microcomputer 101 determines whether the TV timer, which is started in the step S126, exceeds the exposure time TV. When exceeded, the process proceeds to step S128. In step S128, the camera microcomputer 101 finishes the accumulation of the image data by the image pickup device 102 via the TG 104 (T8 of (h) in FIG. 4A), and exceeds with the process to the step S106.

Thus, when performing the shooting with the wireless stroboscope system, the light emission start signal is transmitted to the slave flash device 300A after confirming the communication with the slave flash device 300A, and an electronic shutter mode in which the exposure time TV is defined by the accumulation time of the image pickup device 102 is used.

After that, the camera microcomputer 101 proceeds with the process to the step S108 after performing the same process as in the steps S106 and S107. In the step S108, the camera microcomputer 101 performs the development process of the image data accumulated in the image pickup device 102, stores the developed image into the image storage unit 107, and finishes the shooting process in the step S109.

It should be noted that the accumulation of the image pickup device 102 starts in the step S124 and the light emission start signal is transmitted in the step S125 in the above-mentioned description. On the other hand, the time lag can be decreased by exchanging the orders of processes in the steps S124 and S125 in consideration of the delay of the communication confirmation communication and the time interval between the time when the slave flash device 300A receives the light emission start signal and the time starting emission.

According to this embodiment, in the shooting with the wireless stroboscope system, when the release switch is pushed, the camera microcomputer 101 starts to drive the first curtain of the focal plane shutter before confirming the communication with the slave flash device 300A (T4 in FIG. 4B). And then, after confirming the communication with the slave flash device 300A, the light emission start signal is transmitted to the slave flash device 300A, and the accumulation in an electronic shutter mode starts (T7 in FIG. 4 B). This can solve the above-mentioned problem of the time lag that occurs when the mechanical focal plane shutter is used. When the slave flash device 300A cannot receive the communication confirmation signal transmitted by the master flash device 300 due to interference etc., the communication confirmation signal is transmitted again. Therefore, the exposure timing of the image pickup device coincides with the light-emitting timing of the slave flash device.

Next, a second embodiment of the present invention will be described. The second embodiment differs from the first embodiment in that the technique of the rolling shutter that sequentially shifts the timing of the accumulation start of the image pickup device 102 for every line of pixels according to the running characteristic of the first curtain of the focal plane shutter is used at the time of the shooting with the wireless stroboscope system. The configurations of the camera 100, the master flash device 300, and the slave flash device 300A are the same as those in the first embodiment.

Figure 5:
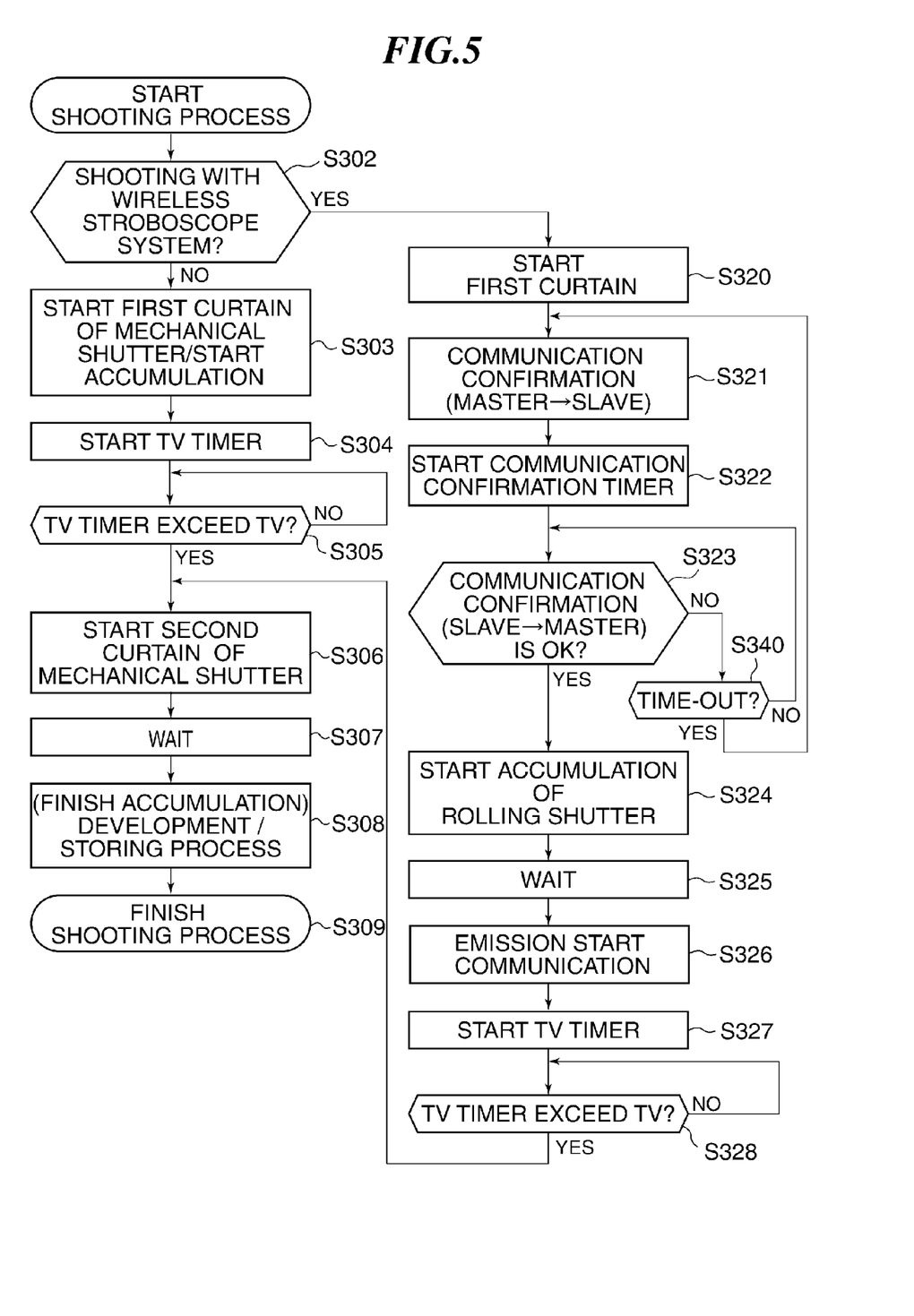
FIG. 5 is a flowchart showing operations at the time of shooting according to a second embodiment.
Figure 6:
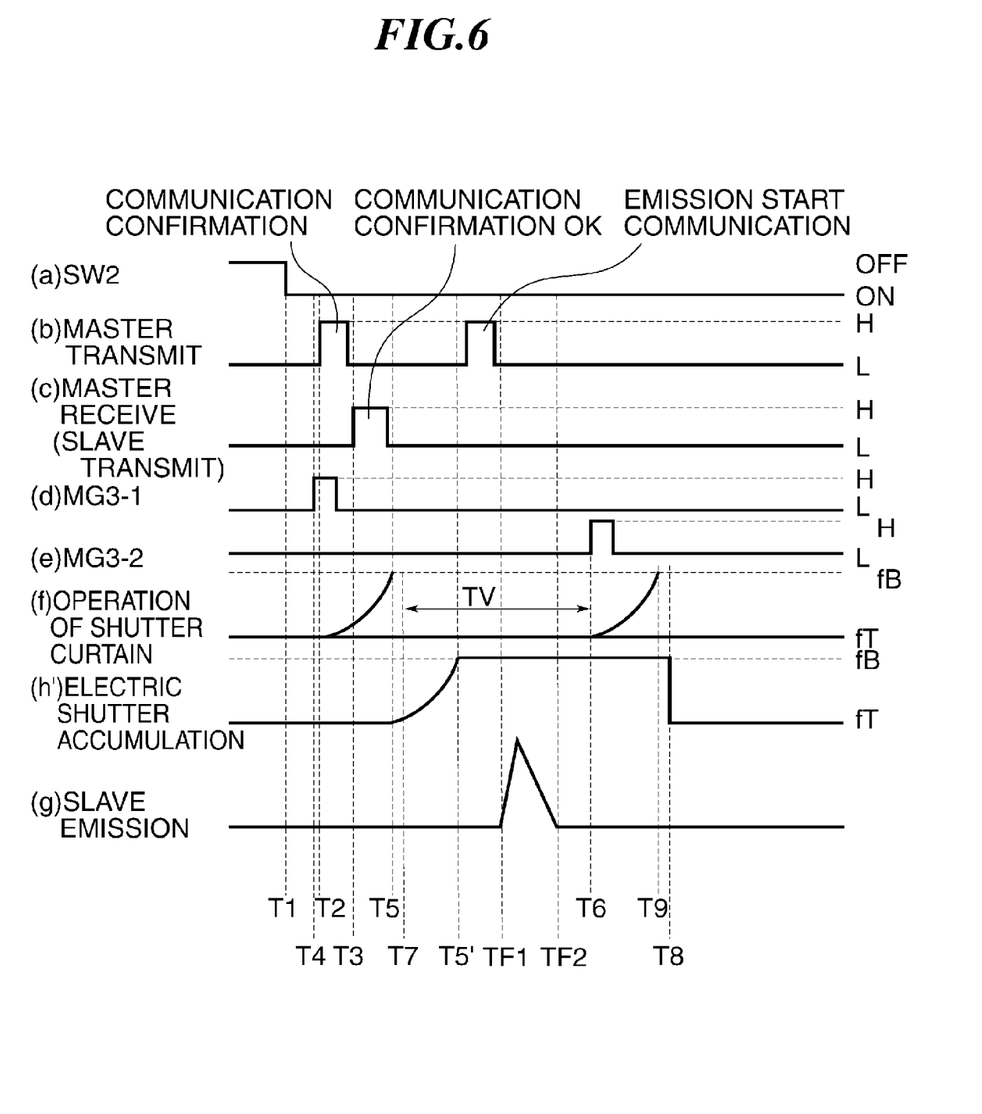
FIG. 6 is a timing waveform chart showing operations at the time of shooting with a wireless stroboscope system according to the second embodiment.

FIG. 5 is a flowchart showing operations at the time of shooting in the second embodiment. FIG. 6 is a timing waveform chart showing the operation at the time of shooting in the second embodiment.

A normal shooting operation (steps S301 through S309 in FIG. 5) in the second embodiment is the same as the normal shooting operation (steps S101 through S109 in FIG. 3) described in the first embodiment. Next, the shooting operation when shooting with the wireless stroboscope system will be described.

A process until the camera microcomputer 101 receives the reply of the communication confirmation OK from the slave flash device 300A via the master flash device 300 is the same as that described in the first embodiment. That is, processes in steps S320 through S323 and step S340 are the same as the processes in the steps S120 through S123 and the step S140 in FIG. 3 described in the first embodiment, respectively.

In the step S323, when the camera microcomputer 101 confirms receipt of the reply of the communication confirmation OK from the slave flash device 300A, the process proceeds to step S324. In step S324, the camera microcomputer 101 starts accumulation of the image data in the image pickup device 102 via the TG 104 for every line with the same running characteristic as operation of the first curtain of the mechanical focal plane shutter 155 (rolling shutter). That is, as shown in the timing T7 of (h') in FIG. 6, the accumulation is started sequentially from the screen top fT to the screen bottom fB of the image pickup device 102 according to the running characteristic of the first curtain of the focal plane shutter 155.

In step S325, the camera microcomputer 101 waits until the rolling shutter finishes to expose to the screen bottom fB in the step S324 (T5 of (h') in FIG. 6). When the timing T5 of (h') in FIG. 6 is elapsed, the camera microcomputer 101 transmits the light emission start signal to the slave flash device 300A using the master flash device 300 in step S326 ((b) T5' of FIG. 6). When receiving the light emission start signal (TF1 of (g) in FIG. 6), the slave flash device 300A starts to emit a light.

In step S327, the camera microcomputer 101 starts a TV timer that measures the exposure time TV. The exposure time TV in this embodiment is defined as a time interval from the timing when the rolling shutter starts accumulation (T7 of (h') in FIG. 6) to the timing when the second curtain of the focal plane shutter 155 starts to block a light to the image pickup device 102 (T6 of (f) in FIG. 6).

In step S328, it is determined whether measurement time of the TV timer, which is started in the step S327, exceeds the exposure time TV. When exceeded, the process proceeds to step S306. It should be noted that the description here is assumed that a time lag does not arise between the time when the MG3-2 terminal becomes the H level and the time when the second curtain starts running. When a time lag arises between the time when the MG3-2 terminal becomes the H level and the time when the second curtain starts running, and when the MG3-2 terminal is switched to the H level after elapsing the exposure time TV, the actual accumulation time becomes longer than the exposure time TV. Therefore, when the time lag arises, the exposure time TV may be reduced by the time lag and may be used for the determination.

In the step S306, the camera microcomputer 101 instructs the shutter driving unit 156 to start running the second curtain of the focal plane shutter 155 by holding the MG3-2 terminals at the H level for a predetermined time interval (T6 of (e) in FIG. 6). In next step S307, the camera microcomputer 101 waits until the second curtain of the focal plane shutter 155 is completed running to the impervious position to shade the image pickup device 102, and then, the process proceeds to step S308. The second curtain of the focal plane shutter 155 finishes running in the timing T9 of (f) in FIG. 6, and shades the image pickup device 102.

In next step S308, the accumulation of the image data by the image pickup device 102 is finished via the TG 104 (T8 of (h') in FIG. 6). It should be noted that since the second curtain of the focal plane shutter 155 has already blocked a light when the accumulation is finished, an accumulation finishing process is performed with respect to all the lines of the image pickup device 102 at once as shown by a timing T8 of (h') in FIG. 6.

Then, the camera microcomputer 101 develops the image data accumulated in the image pickup device 102. The camera microcomputer 101 finishes the shooting process in step S309 after storing the developed image data into the image storage unit 107.

According to this embodiment, the accumulation start of the image data in the image pickup device is performed by the electronic rolling shutter in agreement with the running characteristic of the shutter first curtain. Therefore, since the image pickup device 102 is possible to start the accumulation sequentially from a line corresponding to an opened section of the shutter first curtain, the accumulation of the image pickup device 102 can be started almost simultaneously with the start of running of the shutter. Accordingly, when the reply of the communication confirmation OK is received, even if the first curtain does not reach the pervious position fB that does not shade the image pickup device 102, the accumulation of image data can be started. This reduces the release time lag.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-217429, filed on Sep. 18, 2009, which is hereby incorporated by reference herein in its entirety.

What is claimed is:

1. An image pickup apparatus that enables shooting with a light emission device comprising:
   an image pickup unit configured to accumulate electric charge corresponding to an incident light;
   a mechanical shutter configured to run from an impervious position that blocks the incident light to said image pickup unit to a pervious position;
   an accumulation control unit configured to control a start timing of the accumulation of electric charge by said image pickup unit;
   a determination unit configured to determine whether a communication with the light emission device is possible; and
   a control unit configured to control said mechanical shutter to start running from the impervious position to the pervious position before said determination unit determines that the communication with the light emission device is possible, and to control said accumulation control unit to start accumulation of electric charge after said determination unit determines that the communication with the light emission device is possible, when shooting with the light emission device.

2. The image pickup apparatus according to claim 1, further comprising:
   an operation unit configured to receive a shooting start instruction,
   wherein said determination unit determines whether the communication with the light emission device is possible after receiving the shooting start instruction through said operation unit.

3. The image pickup apparatus according to claim 2, wherein said control unit instructs to start running said mechanical shutter from the impervious position to the pervious position after said operation unit receives the shooting start instruction and before said determination unit determines that the communication with the light emission device is possible.

4. The image pickup apparatus according to claim 1, further comprising:
   a transmission unit configured to transmit a communication confirmation signal to the light emission device; and
   a reception unit configured to receive a reply signal corresponding to the communication confirmation signal from the light emission device,
   wherein said determination unit determines that the communication with the light emission device is possible when said reception unit receives the reply signal.

5. The image pickup apparatus according to claim 1, wherein said control unit instructs the light emission device to start light emission after said determination unit determines that the communication with the light emission device is possible.

6. A control method for an image pickup apparatus that enables shooting with a light emission device and that includes an image pickup unit configured to accumulate electric charge corresponding to an incident light, a mechanical shutter configured to run from an impervious position that blocks the incident light to said image pickup unit to a pervious position, and an accumulation control unit configured to control a start timing of the accumulation of electric charge by said image pickup unit, the control method comprising:
   a determination step of determining whether a communication with the light emission device is possible; an instruction step of instructing the mechanical shutter to start running from the impervious position to the pervious position before it is determined that the communication with the light emission device is possible in said determination step; and
   a starting step of starting the accumulation of electric charge after it is determined that the communication with the light emission device is possible in said determination step when shooting with the light emission device.

* * * * *